United States Patent [19]

DeMartelaere

[11] Patent Number: 5,056,560

[45] Date of Patent: Oct. 15, 1991

[54] QUICK DISCONNECT COUPLINGS UNTHREADED REFRIGERANT FITMENTS

[75] Inventor: David L. DeMartelaere, Romeo, Mich.

[73] Assignee: SPX Corporation, Muskegon, Mich.

[21] Appl. No.: 686,667

[22] Filed: Apr. 17, 1991

[51] Int. Cl.⁵ .............................................. F16L 29/00
[52] U.S. Cl. .............................. 137/614.04; 251/149.5
[58] Field of Search .............. 137/614, 614.04, 614.05, 137/614.06; 251/149.5

[56] References Cited

U.S. PATENT DOCUMENTS

| | | | |
|---|---|---|---|
| 2,706,646 | 4/1955 | Olson | 137/614.04 |
| 2,864,628 | 12/1958 | Edelson | 137/614.04 |
| 3,374,985 | 3/1968 | Cessie | 137/614.04 X |
| 3,731,705 | 5/1973 | Butler | 137/614.04 |

Primary Examiner—John C. Fox
Attorney, Agent, or Firm—Barnes, Kisselle, Raisch, Choate, Whittemore & Hulbert

[57] ABSTRACT

A quick disconnect coupling for unthreaded refrigerant fitments comprising an outer housing, an inner housing over which the outer housing is telescoped and a spring loaded plunger mounted for sliding movement within the inner housing. The inner housing has a circumferential portion at one end that is adapted to telescope over a valve fitting on a refrigeration system which has an annular groove and a one way valve normally closing the fitting. The plunger is normally out of engagement with the one way valve when the coupling is first placed in position on the fitment. Interengaging portions between the outer housing and inner housing operate upon rotation of the inner housing relative to the outer housing to move the outer housing axially relative to the inner housing causing a ramp portion thereon to engage balls on the inner housing and move the balls radially into the groove in the fitting. Further rotation of the inner housing relative to the outer housing causes the outer housing to move axially a further distance to permit the spring loaded plunger to move axially toward the one way valve in the fitting and open the one way valve as well as move the seat in the outer housing away from the plunger and provide communication to the exterior at the other end of the outer housing.

13 Claims, 5 Drawing Sheets

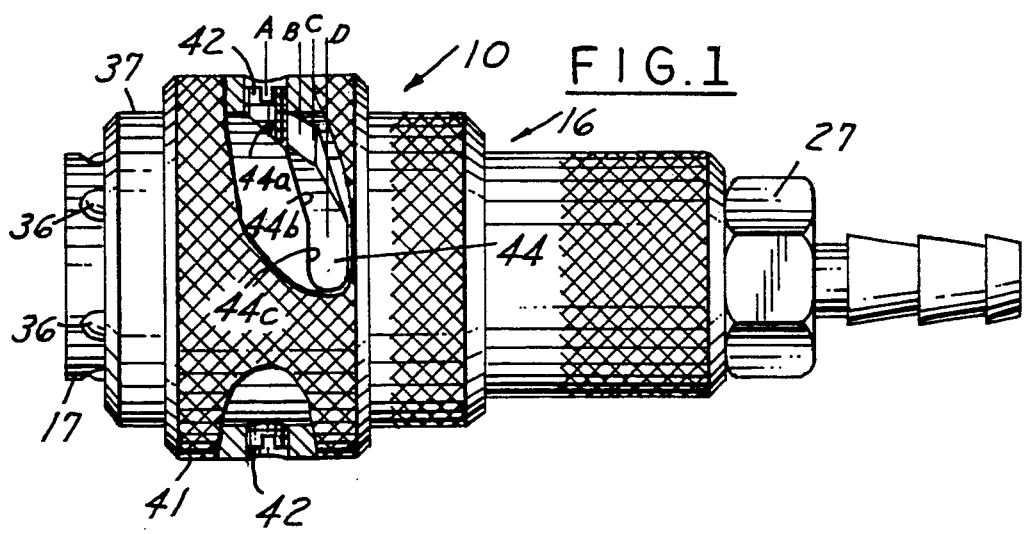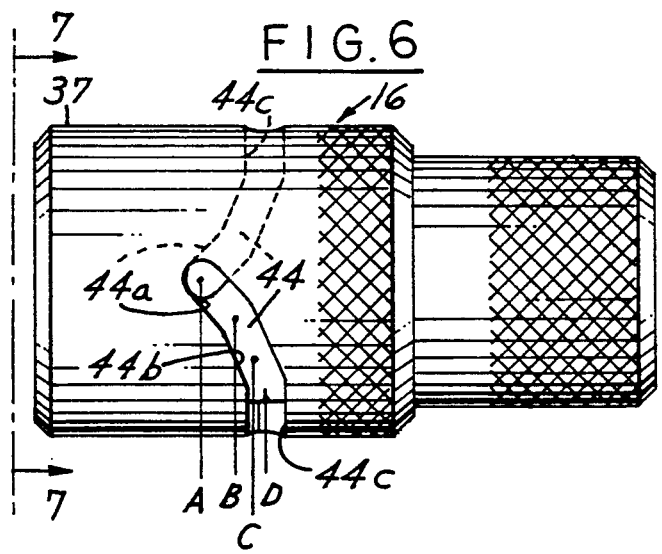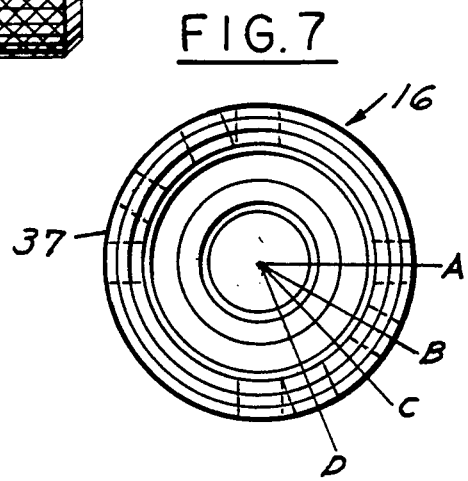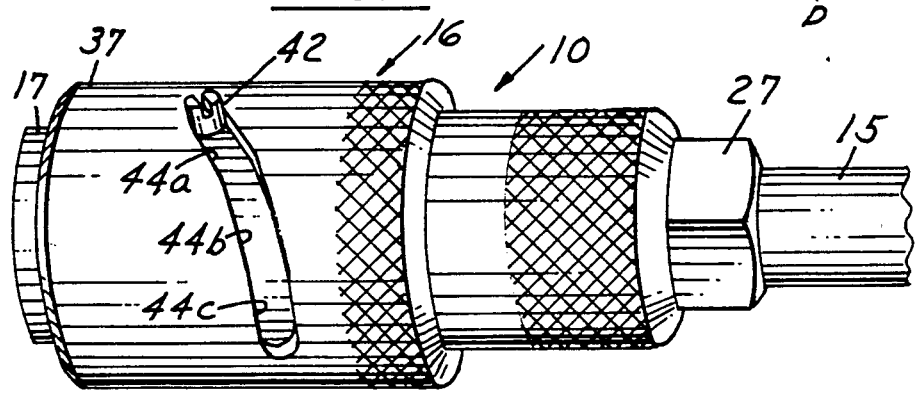

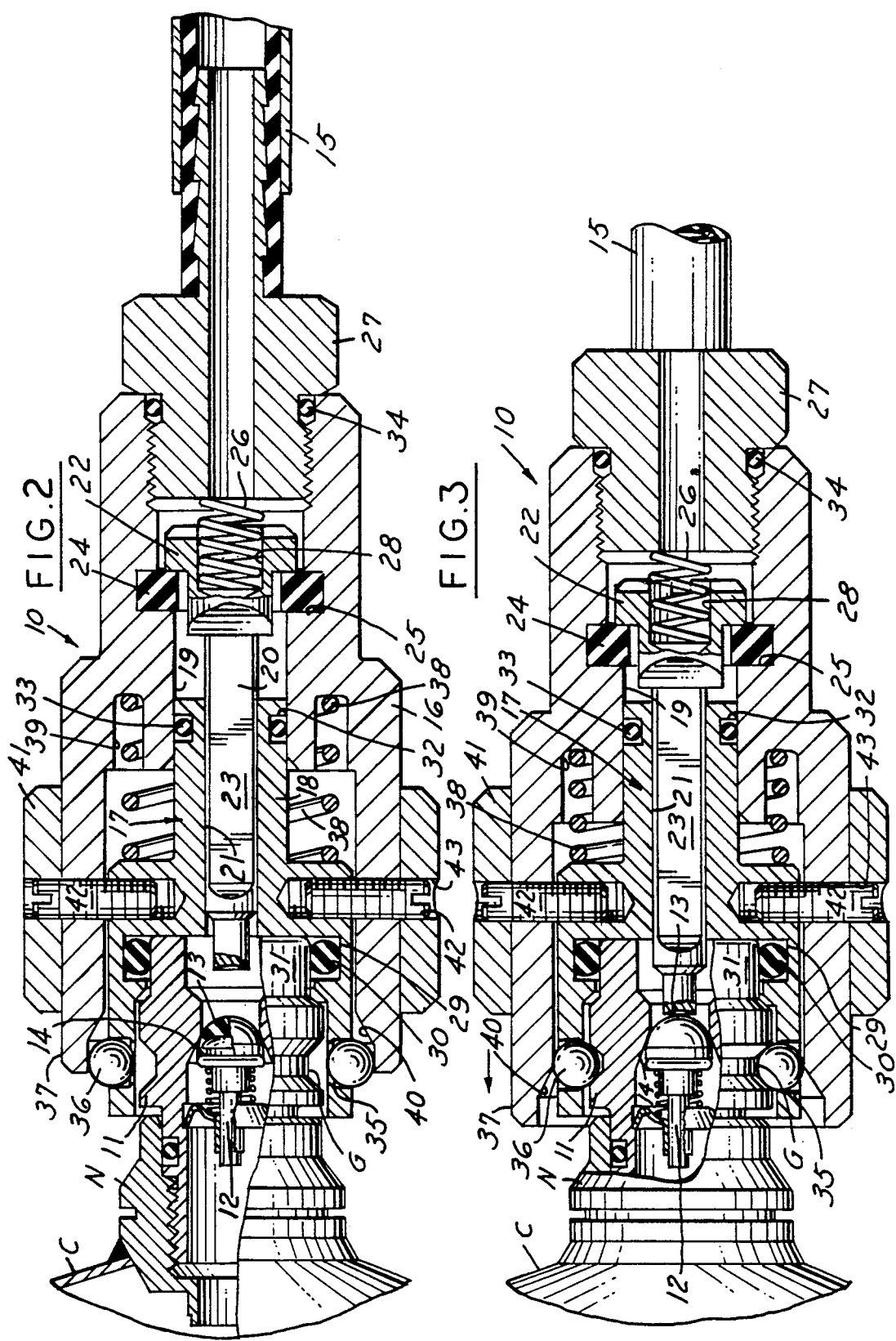

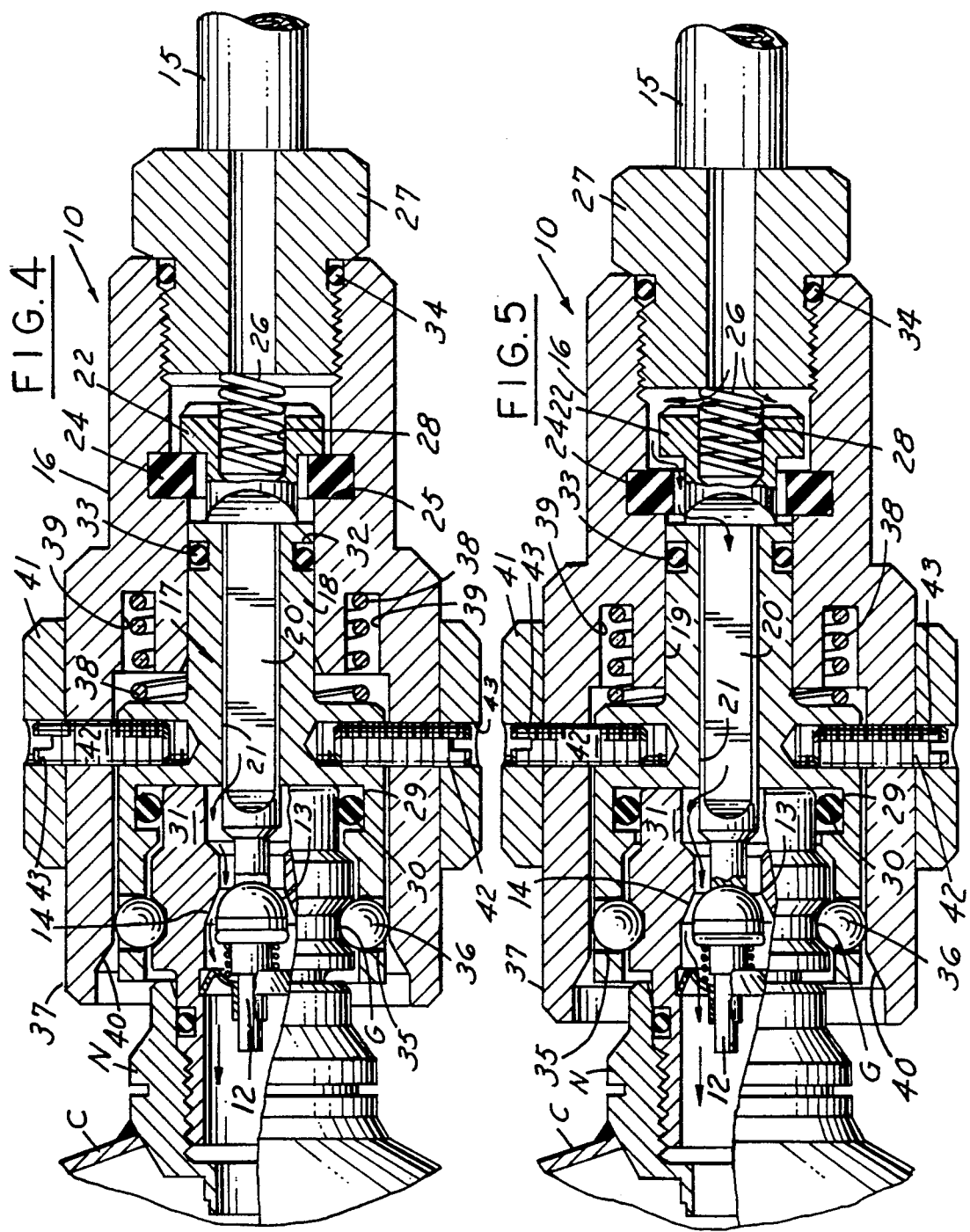

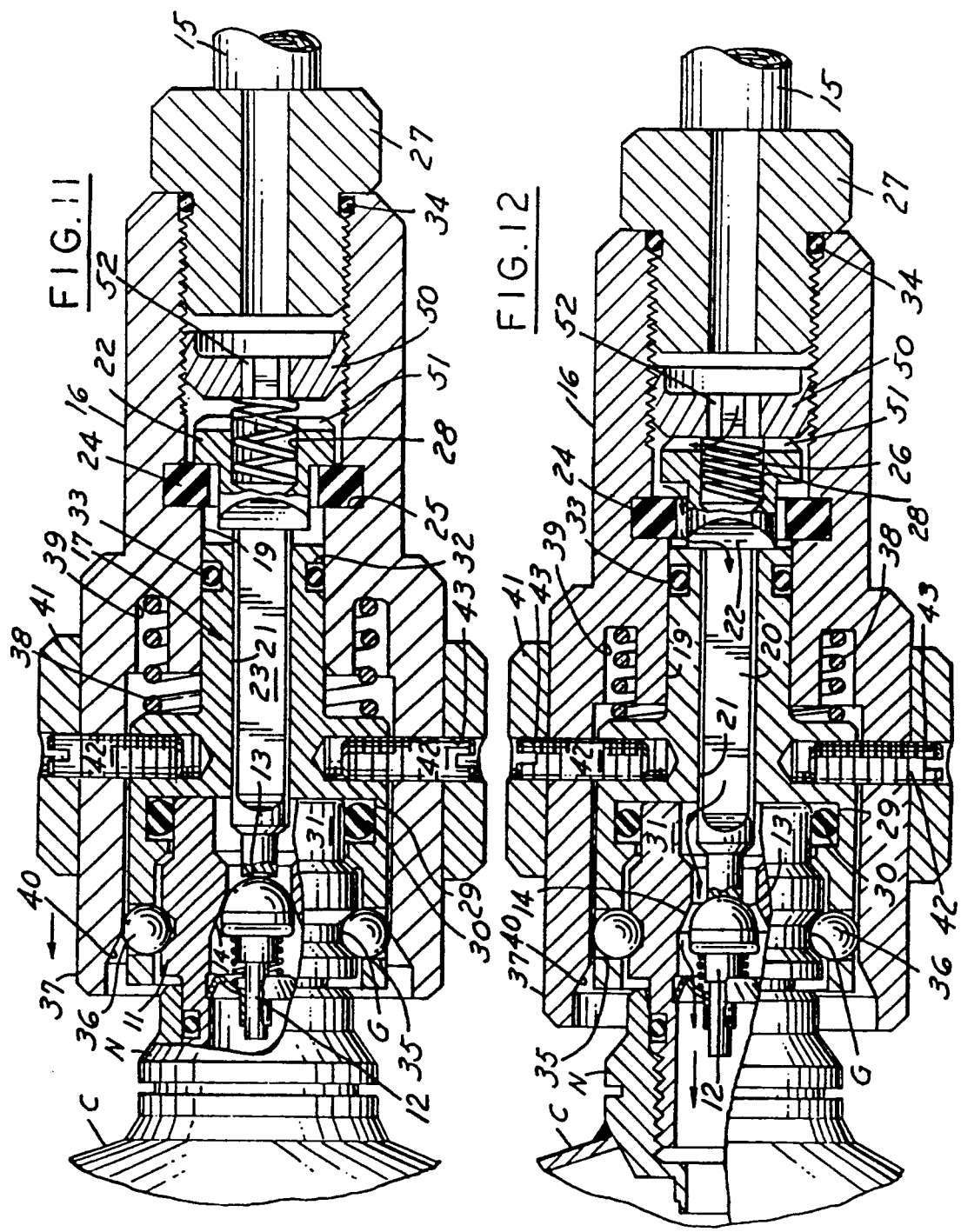

QUICK DISCONNECT COUPLINGS UNTHREADED REFRIGERANT FITMENTS

This invention relates to quick disconnect couplings and particularly to quick disconnect couplings intended for use with refrigerants other than those that have been conventionally used, such as a new refrigerant tetrafluoroethane identified as HFC-134A.

BACKGROUND AND SUMMARY OF THE INVENTION

In the use of refrigerants, such as Freon and the like, it has been common to provide quick disconnect couplings for connecting and disconnecting lines in the systems and particularly lines for servicing a refrigeration system. It is desirable that such couplings be operable to cause substantially no refrigerant to enter the atmosphere.

More recently, it has been recommended that instead of the conventional refrigerant such as Freon other refrigerants which are more environmentally acceptable be utilized. One such refrigerant is known as HFC-134A. In order to prevent prior types of refrigerant from being used in such systems, the industry has adopted a standard for the fitting on which the coupling is to be mounted and specified that the fitting not use threads, as in prior couplings, but rather to use an annular groove or shoulder.

Another problem with respect to prior art couplings, is that in the process of disconnecting the couplings after service, the force of refrigerant under pressure can, under certain circumstances, provide a substantial force that can cause the operator to lose their grasp with the coupling and possibly injure the operator.

Accordingly, among the objectives of the present invention are provide a quick disconnect coupling which is specially adaptable for use with the new refrigerant such as HFC-134A; which is operable to first engage the fitment with which it is used and thereafter to open communication with the fitment and the hose or other device which is being connected by the coupling.

In accordance with the invention, a quick disconnect coupling for unthreaded refrigerant fitments comprising an outer housing, an inner housing over which the outer housing is telescoped and a spring loaded plunger mounted for sliding movement within the inner housing. The inner housing has a circumferential portion at one end that is adapted to telescope over a valve fitting on a refrigeration system which has an annular groove and a one way valve normally closing the fitting. The plunger is normally out of engagement with the one way valve when the coupling is first placed in position o the fitment. A plurality of groove engaging elements in the form of balls are circumferentially provided on the one end of the inner housing for movement radially into and out of engagement with the groove on the fitment. The outer housing is provided with a circumferential portion normally overlying the balls and is movable to bring a ramp portion into engagement with the balls and thereby force the balls into the groove of the fitment. Interengaging portions between the outer housing and inner housing operate upon rotation of the inner housing relative to the outer housing to move the outer housing axially relative to the inner housing causing the ramp portion to engage the balls and move them into the grooves. Further rotation of the inner housing relative to the inner housing causes the outer housing to move axially a further distance to permit the spring loaded plunger to move axially toward the one way valve in the fitting and open the one way valve as well as move the inner housing axially away from a seat in the outer housing and provide communication to the exterior at the other end of the outer housing.

DESCRIPTION OF THE DRAWINGS

FIG. 1 is an elevational view of a refrigerant coupling embodying the invention.

FIGS. 2-5 are longitudinal sectional views showing the quick disconnect coupling in different positions as it is being manipulated on a refrigerant fitting.

FIG. 6 is an elevational view of the outer housing of the quick disconnect coupling.

FIG. 7 is an end view taken along the line 7—7 in FIG. 6.

FIG. 8 is a perspective of the quick disconnect coupling view.

FIG. 11 is a sectional view similar to FIG. 3 of a modified form of the invention.

FIG. 12 is a sectional view similar to FIG. 5 of the modified form shown in FIG. 11.

DESCRIPTION

Figure 9:
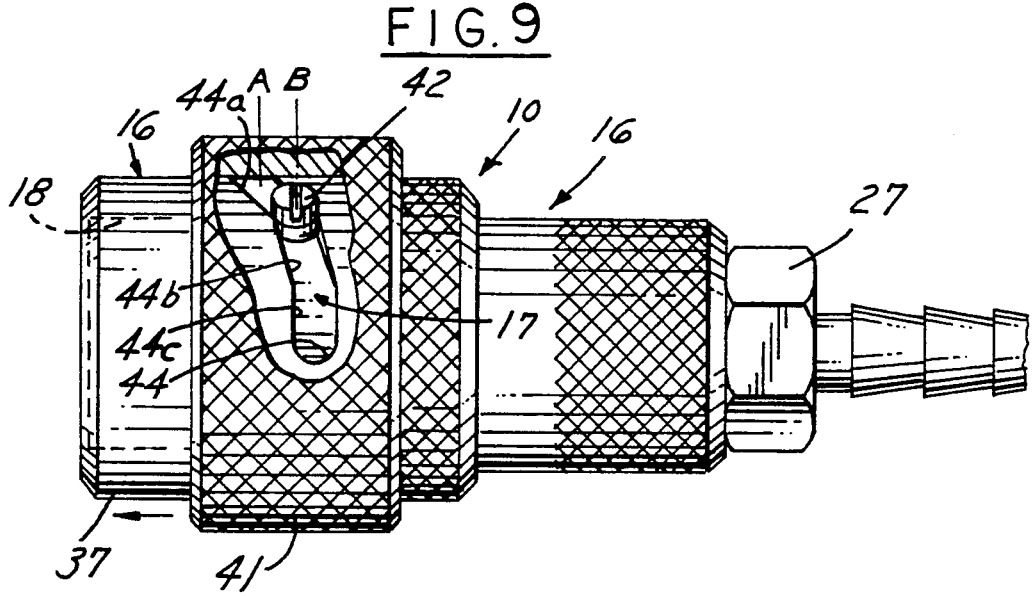
FIG. 9 is a view similar to FIG. 1 showing the quick disconnect coupling in a different operative position.

Referring to FIG. 1, the quick disconnect coupling 10 embodying the invention is adapted to be mounted on a fitting 11 mounted on a hex nut N (FIG. 2) that is fixed as by welding upon a portion of a refrigeration system such as component C (FIG. 2). Fitting 11 is threaded into the hex nut N. Fitting 11 includes a spring loaded one way valve 12 that has a resilient head 13 which engages a tapered portion 14 to close communication to the refrigerant element on which it is mounted. The other end of the coupling 10 is adapted to be connected to a tube or hose 15 (FIG. 2).

Figure 10:
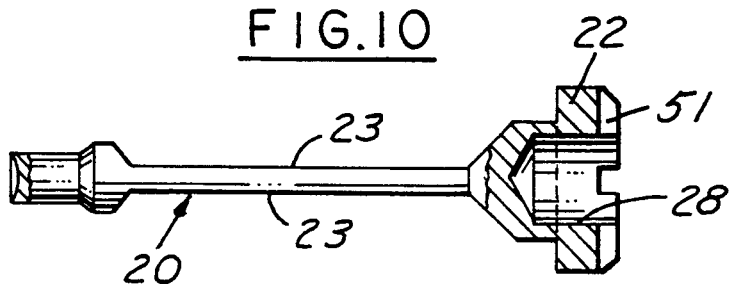
FIG. 10 is a plan view of a valve plunger utilized in the quick disconnect coupling.
Figure 13:
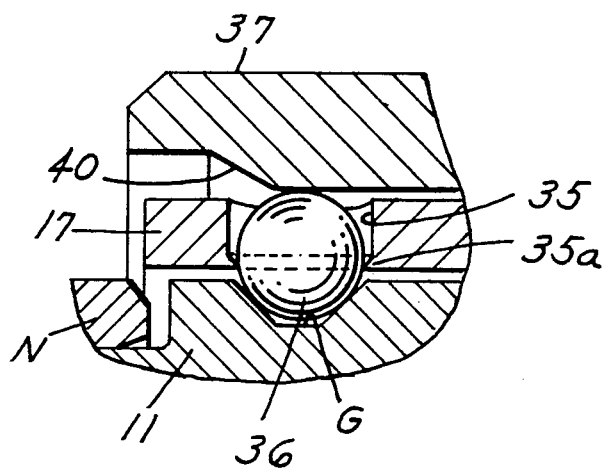
FIG. 13 is an enlarged fragmentary view of a portion of FIG. 3.

Referring to FIG. 2, the coupling 10 includes an outer generally tubular housing 16 and an inner generally tubular housing 17 over which the outer housing 16 is telescoped. The inner housing 17 includes a tubular projection 18 that is slidably engaged in an axial opening 19 in the outer housing 16. A plunger 20 is slidably received in an axial opening 21 in the inner housing 17 and has a concave end at one end, an enlarged head 22 at the other end and flattened intermediate sides 23 to facilitate communication of the refrigerant (FIG. 10). The enlarged head 22 is adapted to engage an annular sealing ring 24 seated in a groove 25 in the outer housing 16. A spring 26 is interposed between a threaded fitment 27 which is threaded into the other end of the outer housing 16 and extends into an opening 28 in the head 22 to urge the plunger 20 against the seal 24.

At one end, the inner housing 17 has a groove 29 receiving a annular sealing ring 30 in the form of an O-ring which is adapted to sealingly engage a cylindrical portion 31 of the fitting 11. The inner housing 16 also includes an annular groove 32 on the projection 18 receiving an O-ring 33 engaging the opening 19 in the outer housing 16. An additional O-ring 34 is provided between the fitment 27 and the other end of the outer housing 17.

At one end, the inner housing 16 includes a plurality of circumferentially spaced openings 35 in which elements in the form of balls 36 are movable radially. The outer housing 16 has an annular portion 37 at one end normally overlying the balls 36 and holding them into position. A spring 38 is positioned in an annular open end groove 39 in the outer housing 17 and extends toward and engages the inner housing 16 to urge the housing 16, 17 axially apart.

The quick disconnect coupling 10 further includes means between the outer housing 16 and the inner housing 17 that is operable upon rotation of the inner housing to move successively the outer housing 16 axially against the action of spring 38 interposed between the outer housing 16 and the inner housing 17 bringing an annular tapered ramp portion 40 at the one end of the outer housing 16 into engagement with the balls 36 and moving the balls 36 into a groove G in the fitting 11. The interengaging means is further operable upon further rotation of the inner housing 17 relative to the outer housing 16 to permit the plunger 20 to move, bringing it in position for engaging the one way valve 12 in the fitting 11, against the action of its spring, and opening communication with the refrigerant component C on which the fitting 11 is mounted and also moving the plunger 20 relatively to disengage the sealing ring 24.

The interengaging means comprises a collar 41 surrounding the outer housing and radial studs 42 that extend through circular openings 43 in the collar and slots 44 in the outer housing 16 and are threaded into threaded radial openings 45 in the inner housing 16. The configuration of the slot 44 is such as shown in FIG. 6, that initial relative rotation of the collar 41 and the inner housing 17 causes the studs 42 to move along the slot sufficiently to draw the outer housing 16 axially to the left as viewed in FIGS. 2-5 until the ramp portion 40 moves the balls 36 into engagement with the groove G of the fitting 11 (FIG. 3). Further rotation of the inner housing 17 causes the outer housing 16 to move axially to permit the plunger 20 to move and open the one way valve 12 in the fitting 11 or by movement of the plunger 20 to the left under the action of spring 26, as viewed in FIG. 4. Continued further rotation of the inner housing 16 causes the outer housing 17 to move axially to cause the sealing ring 24 of the plunger 20 to move away from the head 22 of the plunger 20 (FIG. 5). This permits refrigerant to flow through an opening in the fitment 27 and the associated line or hose 15 into the element that is being serviced. Further rotation of the inner housing 17 causes the studs 42 to move and lock the coupling in position.

In the event that the refrigerant element on which the one way fitting 11 is being used is pressurized and the line 15 has a lower or vacuum pressure, flow will be in the opposite direction.

Upon completion of the servicing, rotation of the inner housing 17 in the opposite direction will cause the head 20 to close against sealing ring 24, the one way valve 12 to close and then the balls 36 to become disengaged. In this manner, the removal process is not affected by any pressure in the system. The openings 35 in which the balls 36 are positioned have their inner ends of reduced cross section, as shown at 35a in FIG. , such that the balls 36 will be retained in the openings 35 when the coupling 10 is disconnected from the fitting 11 on the refrigeration system.

In practice, the operator grasps the collar 41 knurled portion of one hand and the outer housing 17 on the knurled portion at the other end and rotates the inner housing 16 clockwise as viewed from the right. Initially, the studs 42 are at one end of the slot 44 which is axially nearest the end of the fitting 11 (FIG. 3). Each slot 44 preferably includes a first portion 44a that extends at an inclined angle with respect to the axis of the fitting, a second portion 44b which extends at a greater included angle relative to the axis of the portion 44a and a portion 44c which extends circumferentially at 90° to the axis (FIG. 6).

Referring to FIGS. 2-7, as the inner housing 17 is rotated, the studs 42 move along the first portion 44a of the slots 44 to cause the balls 36 to be moved inwardly from position A to position B (FIG. 3). This occurs relatively quickly and locks the balls in the groove G. Further rotation causes the studs 42 to follow the portion 44b from position B to position C to open the inlet valve 12 and the seal at sealing ring 24. Further rotation of the inner housing 17 causes the studs 42 to move along the portions 44c from position C to position C and lock the coupling 10 on the fitting 11.

Referring to FIG. 11, where the one way valve 12 has a strong spring, it has been found that the force of spring 26 may be insufficient to open valve 12 and it is desirable to add a positive stop 50 threaded in the inner housing 17 adjacent the head 22 of plunger 20. The nut 50 is positioned in predetermined spaced relation to the head 22 of plunger 20 such that the head 22 engages the stop when the inner housing 17 rotates relative to the outer housing 16 and moves the outer housing 16 axially to force the plunger 20 against the valve 12 and open it. When the coupling is fully open as shown in FIG. 12, a free flow path is provided across the slot 51 of head 22. Stop 50 is preferably provided with a hexagonal opening 52 for calibrating the position of the stop 50 during assembly.

It can thus be seen that there has been provided a quick disconnect coupling which is specially adaptable for use with the new refrigerants such as HFC-134A; which is operable to first engage the fitment with which it is used and thereafter to open communication with the fitment and the hose or other device which is being connected by the coupling.

I claim:

1. A quick disconnect coupling for unthreaded refrigerant fitments comprising
an outer housing having a seal at one end,
an inner housing over which the outer housing is telescoped and a spring loaded plunger mounted for sliding movement within the inner housing,
said inner housing having a circumferential portion at one end that is adapted to telescope over a valve fitting on a refrigeration system which has an annular groove and a one way valve normally closing the fitting,
said plunger normally having one end out of engagement with the one way valve when the coupling is first placed in position on the fitment,
a plurality of groove engaging elements provided on the one end of the inner housing for movement radially into and out of engagement with the groove on the fitment,
said outer housing having a circumferential portion normally overlying the elements and movable to bring a ramp portion thereon into engagement with the elements and thereby force the elements into the groove of the fitment, and interengaging portions between the outer housing and inner housing operatable upon rotation of the inner housing to move the outer housing axially relative to the inner housing causing the ramp portion to engage the elements and move them into the grooves, and further rotation of the outer housing relative to the inner housing causes the outer housing to move axially to permit the spring loaded plunger to move axially toward the one way valve in the fitting and open the one way valve as well as move the seal away from the plunger and provide communication to the exterior at the other end of the outer housing.

2. The quick disconnect coupling set forth in claim 1 wherein said interengaging means comprises at least one radial projection on the inner housing, a slot on the outer housing, said radial projection projecting into said slot, the configuration of said slot being such that rotation of the outer housing relative to the inner housing causes said relative movements of the outer housing, inner housing and plunger.

3. The quick disconnect coupling set forth in claim 2 wherein the apparatus includes a collar surrounding the outer housing, said radial projection extending into said housing such that rotation of the collar rotates the inner housing relative to the outer housing to move the outer housing axially relative to the inner housing.

4. The quick disconnect coupling set forth in claim 2 including sealing means at one end of said inner housing for sealingly engaging said fitting.

5. The quick disconnect coupling set forth in claim 2 including sealing means between said projection on said inner housing and said slot in said outer housing.

6. The quick disconnect coupling set forth in claim 1 including spring means between said inner housing and outer housing urging said inner housing toward said circumferential portion of said outer housing.

7. The quick disconnect coupling set forth in claim 6 wherein said spring means between said outer housing and said inner housing comprises an annular recess in said outer housing and spring means in said recess extending axially into engagement with said inner housing.

8. The quick disconnect coupling set forth in claim 1 wherein said groove engaging elements comprise balls.

9. The quick disconnect coupling set forth in claim 8 including a collar surrounding said outer housing, said stud extending into an opening in said collar such that said inner housing can be rotated by grasping said collar.

10. The quick disconnect coupling set forth in claim 8 including a second radial projection on the inner housing and a second slot in said outer housing.

11. The quick disconnect coupling set forth in claim 1 including an adjustable stop between the end of said plunger and said outer housing and operable to engage said plunger and positively open the one-way valve.

12. The quick disconnect coupling set forth in claim 11 including spring means between said inner housing and outer housing urging said inner housing toward said circumferential portion of said outer housing.

13. The quick disconnect coupling set forth in any one of claims 2–12 wherein said slot comprises a first portion extending at an acute angle relative to the axis of the outer housing, a second portion extending at a greater acute angle relative to the axis of said outer housing and a thread portion extending circumferentially at a angle of 90° relative the axis of said outer housing.

* * * * *